(12) United States Patent
Saxegaard et al.

(10) Patent No.: US 10,049,838 B2
(45) Date of Patent: Aug. 14, 2018

(54) SWITCHING DEVICE AND AN ELECTRIC POWER DISTRIBUTION SWITCHGEAR

(71) Applicant: ABB Schweiz AG, Baden (CH)

(72) Inventors: Magne Saxegaard, Porsgrunn (NO); Ståle Talmo, Skien (NO); Stanley Lohne, Porsgrunn (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/575,458

(22) PCT Filed: Apr. 27, 2016

(86) PCT No.: PCT/EP2016/059362
§ 371 (c)(1),
(2) Date: Nov. 20, 2017

(87) PCT Pub. No.: WO2016/198209
PCT Pub. Date: Dec. 15, 2016

(65) Prior Publication Data
US 2018/0158630 A1   Jun. 7, 2018

(30) Foreign Application Priority Data
Jun. 11, 2015 (EP) .................................. 15171565

(51) Int. Cl.
*H02B 11/133* (2006.01)
*H02B 13/025* (2006.01)
(Continued)

(52) U.S. Cl.
CPC .......... *H01H 33/53* (2013.01); *H01H 31/003* (2013.01); *H01H 33/22* (2013.01);
(Continued)

(58) Field of Classification Search
CPC .. H02B 11/133; H02B 13/025; H02B 13/035; H02B 13/045; H02B 3/00; H02B 11/12;
(Continued)

(56) References Cited

U.S. PATENT DOCUMENTS 3,876,846 A * 4/1975 Graybill ................. G01R 15/16
218/68
6,657,150 B1 * 12/2003 Shea .................... H01H 3/3031
218/154
(Continued)

FOREIGN PATENT DOCUMENTS

CN   201498420 U   6/2010
EP   0117754 A2   9/1984
(Continued)

OTHER PUBLICATIONS

European Search Report Application No. EP 15 17 1565 Completed: Dec. 15, 2015; dated Jan. 5, 2016 4 pages.
(Continued)

*Primary Examiner* — Adam B Dravininkas
(74) *Attorney, Agent, or Firm* — Whitmyer IP Group LLC

(57) ABSTRACT

A power distribution switchgear including a housing to which a switch is mounted, housing has an opening, the first and second electric contact connected to a first and second conductors. A rotating operating shaft of inserted into the opening, and an actuator having a first end coupled to the shaft and a second end coupled to the second contact. The actuator and shaft made of an electrically insulating material. The shaft supported in the housing by the actuator member. The interface is located at a distance D from the longitudinal axis Y of the shaft that is longer than a distance d between axis Y and a circumferential edge that delimits the opening.

16 Claims, 4 Drawing Sheets

(51) Int. Cl.
    *H01H 31/00*     (2006.01)
    *H01H 50/00*     (2006.01)
    *H01H 33/53*     (2006.01)
    *H01H 33/42*     (2006.01)
    *H02B 13/055*     (2006.01)
    *H01H 33/22*     (2006.01)

(52) U.S. Cl.
    CPC ........... *H01H 33/42* (2013.01); *H02B 11/133* (2013.01); *H02B 13/055* (2013.01); *H01H 2205/002* (2013.01); *H01H 2223/008* (2013.01); *H01H 2239/044* (2013.01)

(58) Field of Classification Search
    CPC .. H02B 13/055; H01H 31/003; H01H 50/002; H01H 9/56; H01H 9/26; H01H 47/002; H01H 50/323; H01H 33/666; H01H 33/6661; H01H 33/53; H01H 33/22; H01H 33/42; H01H 2223/008; H01H 2205/002; H01H 2239/044
    See application file for complete search history.

(56) References Cited

U.S. PATENT DOCUMENTS

| | | | | |
|---|---|---|---|---|
| 6,744,255 | B1* | 6/2004 | Steinbrecher | H01R 4/66 324/511 |
| 7,767,917 | B2 | 8/2010 | Granhaug et al. | |
| 8,309,872 | B2* | 11/2012 | Peter | H01H 33/666 218/118 |
| 2008/0078666 | A1* | 4/2008 | Ohda | H01H 3/30 200/400 |
| 2009/0065333 | A1* | 3/2009 | Granhaug | H01H 33/24 200/237 |
| 2009/0078681 | A1* | 3/2009 | Marchand | H01H 33/6606 218/140 |
| 2010/0126967 | A1* | 5/2010 | Ohda | H01H 3/3031 218/154 |
| 2011/0253675 | A1* | 10/2011 | Heller | H01H 33/66261 218/5 |
| 2013/0126479 | A1* | 5/2013 | Shang | H01H 33/66207 218/120 |
| 2013/0161290 | A1 | 6/2013 | Zhang et al. | |
| 2014/0054148 | A1* | 2/2014 | Marushima | H01H 33/40 200/400 |

FOREIGN PATENT DOCUMENTS

| | | |
|---|---|---|
| JP | 2000340075 A | 8/2000 |
| KR | 101356550 B1 | 1/2014 |
| KR | 20140008133 A | 1/2014 |
| WO | 2014154292 A1 | 10/2014 |

OTHER PUBLICATIONS

International Search Report and Written Opinion of the International Searching Authority Application No. PCT/EP2016/059362 Completed: May 30, 2016; dated Jun. 9, 2016 11 pages.

\* cited by examiner

SWITCHING DEVICE AND AN ELECTRIC POWER DISTRIBUTION SWITCHGEAR

TECHNICAL FIELD

The present disclosure relates to a switching device, and an electric power distribution switchgear comprising a sealed gas tight encapsulation inside which is located at least one switching device.

BACKGROUND

Switchgears are used in electric power systems, with the purpose to control, protect and isolate electric equipment. In distribution nets, switchgears are located both on the high voltage side and the low voltage side of power transformers.

Switchgears used today for medium and/or high voltages are usually gas insulated switchgears (GIS), where the used insulating fluid is Sulphur hexafluoride (SF6). The use of SF6 allows for a compact design of the switchgear, since SF6 has good properties when it concerns dielectric performance and thermal performance, in particular related to preventing and dealing with unwanted electric discharges, e.g. arcs, and heat dissipation.

Generally, compact 3-phase switchgears used today for medium/high voltages AC power distribution systems comprise one to five modules inside a sealed encapsulation containing the insulation gas. Each module comprises typically a minimum of three switching assemblies, one for each phase. If the module is a circuit breaker module, each switching assembly would generally comprise a circuit breaker, a disconnector switch and an earthing switch that may be combined with the disconnector switch. If the module is a load break switch module, each switching assembly would generally comprise a load break switch that may be combined with an earthing switch, or combined with a disconnector switch with or without earthing switch.

As mentioned above, usually SF6 (sulfurhexafluoride) is used as insulation fluid/gas, which is very good for preventing and dealing with unwanted electric discharges, e.g. arcs. However, SF6 is a fluorinated gas that has a high global warming potential (GWP) and therefore alternative solutions are searched for. At the same time, it is desirable to keep the compactness of present switchgears with SF6, even if utilising other insulation fluids with lesser dielectric performance.

A switchgear and switching assembly is known from WO/2014/154292 in which a three-position switch is used for connection to the incoming electric bushing and earth, and a vacuum breaker is used for connection to the busbar, via the electrically conductive housing. In this document is discussed problems related to compactness of the switchgear and alternatives to SF6.

An example of a prior art switch is known from U.S. Pat. No. 7,767,917 that is fitted with field control rings.

SUMMARY

In the design of gas insulated switchgear, a commonly observed problem is the reduced electrical withstand level that is due to discharge from "triple points". Triple points are locations where metal, insulator material and gas meet under a large difference in potential. It can be shown that the electrical field diverges to infinity when approaching the point where metal and insulator meet at a sharp angle. Even though an infinite electrical field is physically impossible, practical experience has shown that these triple points can be the source of partial discharge that may in turn lead to complete breakdown.

Triple points are difficult to avoid in a typical GIS design, because insulating materials are required for mechanical support of metal parts at different potentials. A common strategy for handling this is to "shield" the triple point, i.e. making any nearby metallic surface rounded in such a way that the electrical stress seen by the triple point is reduced. However, as long as the triple point can see a potential difference, there will always be a limiting case where the field stress is high enough to cause both partial and full discharge from or nearby the triple point. An example of a triple point is where the insulated operating shaft for the movable electric contact of a two-position switch is inserted into an electrically conductive housing and is in contact with, or at least close to, the wall of the opening in the housing.

With the transition from SF6 to alternative low-GWP gases with reduced electrical withstand properties, the need for handling triple points has become even more critical.

An object of the present disclosure is to provide a switching device which has improved triple point characteristics, and which is suitable for use in an encapsulated electric power distribution switchgear.

Accordingly is defined a switching device for an encapsulated electric power distribution switchgear comprising a switch, and an electrically conductive housing to which the switch is mounted, and which housing comprises an opening that leads into the housing, wherein the switch comprises a first electric contact assembly electrically connected to a first electric conductor and a second electric contact assembly electrically connected to a second electric conductor, the second electric contact assembly being movable in relation to the first electric contact assembly and in relation to the housing, the switching device further comprising an insulated operating shaft of electrically insulating material for operating the switch and having a longitudinal axis and being rotatable about its longitudinal axis in relation to the housing, and of which a part is inserted into the housing via the opening, an actuator member located inside the housing and having a first end coupled to the operating shaft and a second end coupled to the second electric contact assembly, wherein, by rotation of the operating shaft coupled to the actuator member, the second electric contact assembly is movable between a first closed position and a second open position of the switch, in which closed position the second contact assembly is in contact with the first electric contact assembly, and in which open position the second contact assembly is not in contact with the first electric contact assembly, characterized in that the actuator member is made of an electrically insulating material, the operating shaft extends through the opening and into the housing without directly contacting the housing at the opening, the operating shaft is supported in the housing by the actuator member, the actuator member is movably supported in the housing at a connection area that is located within the housing and which connection area forms an interface between the actuator member and the housing, and that the interface is located at a first distance from the longitudinal axis of the operating shaft that is longer than a second distance between the longitudinal axis of the operating shaft and a circumferential edge that delimits the opening in the housing, which first and second distances are measured in the same radial direction in relation to the longitudinal axis.

By making the actuator member of an electrically insulating material, supporting the operating shaft in the actuator member and having it extend through the opening and into the housing without being in direct contact with the housing at the opening, in combination with having the interface between the actuator member and the housing located at a first distance from the longitudinal axis of the operating shaft that is longer than a second distance between the longitudinal axis of the operating shaft and a circumferential edge that delimits the opening in the housing, which first and second distances are measured in the same radial direction in relation to the longitudinal axis, is obtained the advantage that the triple point will be located at the interface which is completely hidden from outside and shielded by the housing. There will be no triple point at the opening into the housing as in prior art. Thus the risk of electrical discharges is reduced. This has also the advantage that the switching device is suitable for use in metal enclosed gas insulated switchgear when other insulation gases than SF6 are used. When the triple points are shielded the compactness of the switchgear can be preserved, even if utilising other insulation fluids than SF6 which have lesser dielectric performance.

The actuator member may be rotatably supported in the housing in the connection area. This is one possible embodiment but the inventive idea may also be applied for other configurations of actuator members.

According to one embodiment, the actuator member may be rotatably supported in the housing in the connection area by means of at least one bearing device mounted in the housing. The connection area of the housing will then be constituted by the bearing device, and the bearing device will naturally facilitate the rotation of the actuator member. In order to obtain the desired location of the triple point, the at least one bearing device is preferably an electrically conductive bearing device that is attached mechanically and electrically to the electrically conductive housing.

According to another embodiment, the actuator member may be supported directly in the housing in the connection area. This has the advantage of being a very simple and inexpensive solution.

According to another feature, the operating shaft is supported in the housing solely by the actuator member. This has the advantage of avoiding the occurrence of other triple points.

According to yet another feature, the second end of the actuator member may comprise a tube shaped part and the operating shaft is coupled to the actuator member by being supported in the tube shaped part of the actuator member. The tube-shaped part is a simple and robust way of supporting the operating shaft in the actuator member. However, other ways of coupling and supporting the operating shaft are not excluded.

According to a further feature, the opening may be a first entry opening for the operating shaft into the housing and the housing further comprises a second exit opening through which the operating shaft exits from the housing, and wherein the operating shaft extends through the second exit opening without directly contacting the housing at the second exit opening, and the interface is located at a first distance from the longitudinal axis of the operating shaft that is longer than a second distance between the longitudinal axis of the operating shaft and a circumferential edge that delimits the second opening in the housing, which first and second distances are measured in the same radial direction in relation to the longitudinal axis. Depending on how and where the switching device is used, the operating shaft may extend all the way through the housing. This is for example applicable for at least two of the phases if the switching device is used in a three-phase module in a power distribution switchgear. In such a switchgear, three switching devices would be operated by the same operating shaft. The operating shaft would then extend through the first two switching devices and into the third switching device, and possibly also through the third switching device, depending on its design.

According to another aspect of the invention is defined an electric power distribution switchgear comprising a sealed gas tight encapsulation inside which is located at least one switching device as defined in any one of the claims defining a switching device. In such an insulated and encapsulated switchgear it is important to save space and therefore the shielded triple points that are obtained by the invention will make it possible to have a more compact design of the switchgear without having regions with high field stress that will risk causing electrical discharges. The switching device may also comprise an earthing switch.

According to a further feature, the switchgear may comprise a load break switch comprising a switching device as defined in any one of the preceding claims and further comprising a disconnector switch. The disconnector switch may be with or without an earthing switch.

According to a further feature, a dielectric insulation medium may be present in the encapsulation, in particular dielectric insulation gas comprising an organofluorine compound selected from the group consisting of: a fluorether, an oxirane, a fluoramine, a fluoroketone, a fluoroolefin, and mixtures and/or decomposition products thereof. These are all gases having a lower GWP than SF6 and they have the advantage of being more environmentally friendly than SF6.

For the purposes of this disclosure the fluid used in the encapsulated or non-encapsulated electric apparatus can be $SF_6$ gas or any other dielectric insulation medium, may it be gaseous and/or liquid, and in particular can be a dielectric insulation gas or arc quenching gas. Such dielectric insulation medium can for example encompass media comprising an organofluorine compound, such organofluorine compound being selected from the group consisting of: a fluoroether, an oxirane, a fluoramine, a fluoroketone, a fluoroolefin, a fluoronitrile, and mixtures and/or decomposition products thereof. Herein, the terms "fluoroether", "oxirane", "fluoroamine", "fluoroketone", "fluoroolefin", and "fluoronitrile" refer to at least partially fluorinated compounds. In particular, the term "fluoroether" encompasses both fluoropolyethers (e.g. galden) and fluoromonoethers as well as both hydrofluoroethers and perfluoroethers, the term "oxirane" encompasses both hydrofluorooxiranes and perfluorooxiranes, the term "fluoroamine" encompasses both hydrofluoroamines and perfluoroamines, the term "fluoroketone" encompasses both hydrofluoroketones and perfluoroketones, the term "fluoroolefin" encompasses both hydrofluoroolefins and perfluoroolefins, and the term "fluoronitrile" encompasses both hydrofluoronitriles and perfluoronitriles. It can thereby be preferred that the fluoroether, the oxirane, the fluoroamine, the fluoroketone and the fluoronitrile are fully fluorinated, i.e. perfluorinated.

In embodiments, the dielectric insulation medium or more specifically the organofluorine compound comprised in the dielectric insulation medium or gas is selected from the group consisting of: fluoroethers, in particular a or several hydrofluoromonoether(s); fluoroketones, in particular a or several perfluoroketone(s); fluoroolefins, in particular a or several hydrofluoroolefin(s); fluoronitriles, in particular a or several perfluoronitrile(s); and mixtures thereof.

In particular, the term "fluoroketone" as used in the context of the present invention shall be interpreted broadly and shall encompass both fluoromonoketones and fluorodiketones or generally fluoropolyketones. Explicitly, more than a single carbonyl group flanked by carbon atoms may be present in the molecule. The term shall also encompass both saturated compounds and unsaturated compounds including double and/or triple bonds between carbon atoms. The at least partially fluorinated alkyl chain of the fluoroketones can be linear or branched and can optionally form a ring.

In embodiments, the dielectric insulation medium comprises at least one compound being a fluoroketone, which may optionally comprise also heteroatoms incorporated into the carbon backbone of the molecules, such as at least one of: a nitrogen atom, oxygen atom and sulphur atom, replacing a corresponding number of carbon atoms. More preferably, the fluoromonoketone, in particular perfluoroketone, can have from 3 to 15 or from 4 to 12 carbon atoms and particularly from 5 to 9 carbon atoms. Most preferably, it may comprise exactly 5 carbon atoms and/or exactly 6 carbon atoms and/or exactly 7 carbon atoms and/or exactly 8 carbon atoms.

In embodiments, the dielectric insulation medium comprises at least one compound being a hydrofluoroether selected from the group consisting of: hydrofluoro monoether containing at least three carbon atoms; hydrofluoro monoether containing exactly three or exactly four carbon atoms; hydrofluoro monoether having a ratio of number of fluorine atoms to total number of fluorine and hydrogen atoms of at least 5:8; hydrofluoro monoether having a ratio of number of fluorine atoms to number of carbon atoms ranging from 1.5:1 to 2:1; pentafluoro-ethylmethyl ether; 2,2,2-trifluoroethyl-trifluoromethyl ether; and mixtures thereof.

In embodiments, the dielectric insulation medium comprises at least one compound being a fluoroolefin selected from the group consisting of: hydrofluoroolefins (HFO) comprising at least three carbon atoms, hydrofluoroolefins (HFO) comprising exactly three carbon atoms, 1,1,1,2-tetrafluoropropene (HFO-1234yf, also named 2,3,3,3-tetrafluoro-1-propene), 1,2,3,3-tetrafluoro-2-propene (HFO-1234yc), 1,1,3,3-tetrafluoro-2-propene (HFO-1234zc), 1,1,1,3-tetrafluoro-2-propene (HFO-1234ze), 1,1,2,3-tetrafluoro-2-propene (HFO-1234ye), 1,1,1,2,3-pentafluoropropene (HFO-1225ye), 1,1,2,3,3-pentafluoropropene (HFO-1225yc), 1,1,1,3,3-pentafluoropropene (HFO-1225zc), (Z)1,1,1,3-tetrafluoropropene (HFO-1234zeZ; also named cis-1,3,3,3-tetrafluoro-1-propene), (Z)1,1,2,3-tetrafluoro-2-propene (HFO-1234yeZ), (E)1,1,1,3-tetrafluoropropene (HFO-1234zeE; also named trans-1,3,3,3-tetrafluoro-1-propene), (E)1,1,2,3-tetrafluoro-2-propene (HFO-1234yeE), (Z)1,1,1,2,3-pentafluoropropene (HFO-1225yeZ, also named cis-1,2,3,3,3 pentafluoroprop-1-ene), (E)1,1,1,2,3-pentafluoropropene (HFO-1225yeE, also named trans-1,2,3,3,3 pentafluoroprop-1-ene), and mixtures thereof.

In embodiments, the organofluorine compound can also be a fluoronitrile, in particular a perfluoronitrile. In particular, the organofluorine compound can be a fluoronitrile, specifically a perfluoronitrile, containing two carbon atoms, and/or three carbon atoms, and/or four carbon atoms.

More particularly, the fluoronitrile can be a perfluoroalkylnitrile, specifically perfluoroacetonitrile, perfluoropropionitrile ($C_2F_5CN$) and/or perfluorobutyronitrile ($C_3F_7CN$).

Most particularly, the fluoronitrile can be perfluoroisobutyronitrile (according to the formula $(CF_3)_2CFCN$) and/or perfluoro-2-methoxypropanenitrile (according to formula $CF_3CF(OCF_3)CN$). Of these, perfluoroisobutyronitrile is particularly preferred due to its low toxicity.

The dielectric insulation medium can further comprise a background gas or carrier gas different from the organofluorine compound (in particular different from the fluoroether, the oxirane, the fluoroamine, the fluoroketone, the fluoroolefin and the fluoronitrile) and can in embodiments be selected from the group consisting of: air, $N_2$, $O_2$, $CO_2$, a noble gas, $H_2$; $NO_2$, NO, $N_2O$, fluorocarbons and in particular perfluorocarbons, such as $CF_4$, $CF_3I$, $SF_6$; and mixtures thereof.

Generally, the switching device according to the invention may find its application as or in an air-insulated switchgear, gas-insulated metal-encapsulated switchgear (GIS), part or component of gas-insulated metal-encapsulated switchgear, high voltage switch, earthing switch, disconnector, combined disconnector and earthing switch, load-break switch, circuit breaker, gas circuit breaker, generator circuit breaker, gas-insulated vacuum circuit breaker, medium voltage switch, ring main unit, recloser, sectionalizer, low voltage switch, any type of gas-insulated switch.

Further features and advantages of the invention will also become apparent from the following detailed description of embodiments.

BRIEF DESCRIPTION OF THE DRAWINGS

A detailed description of the present invention and embodiments thereof, given as examples only, will now be made with reference to the accompanying schematic drawings, in which.

Elements that are the same or represent corresponding or equivalent elements have been given the same reference numbers in the different figures.

DETAILED DESCRIPTION

Figure 1:
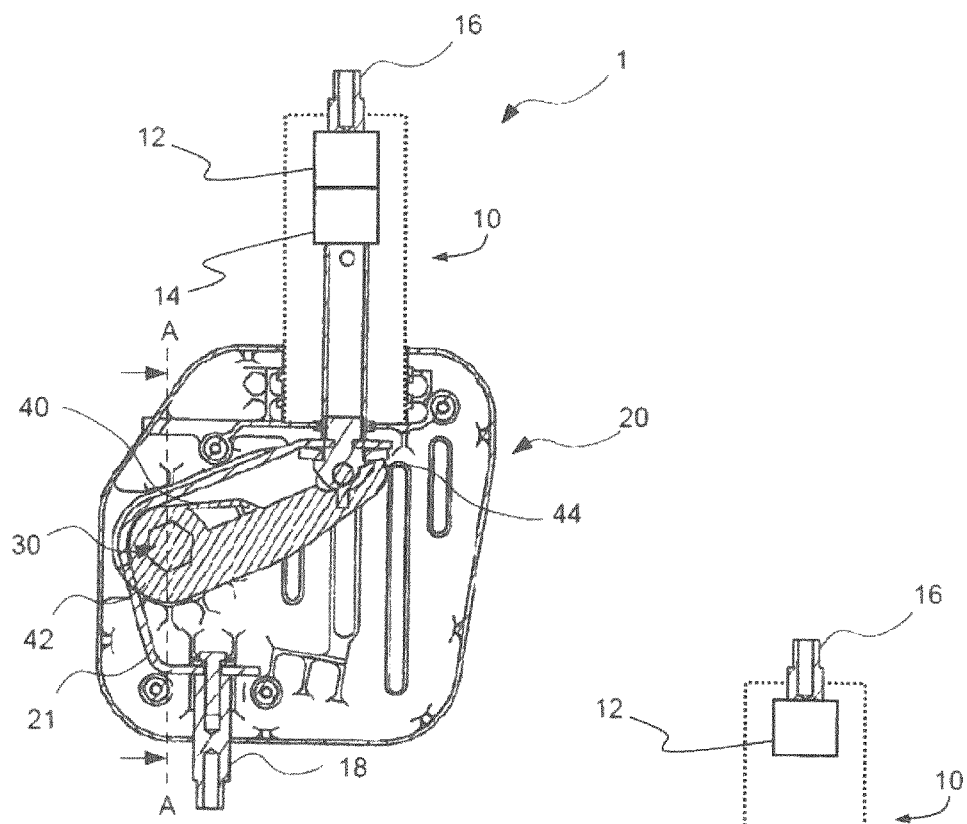
FIG. 1 is a schematic side view, in cross section, of a first embodiment of a switching device according to the present invention.
Figure 2:
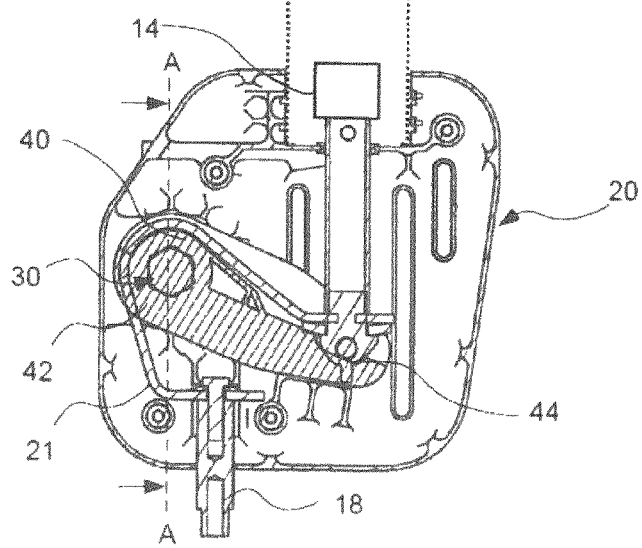
FIG. 2 is a schematic side view, in cross section, of a first embodiment of a switching device according to the present invention.

In FIGS. 1 and 2 is shown a schematic illustration, in cross section, of a switching device 1 according to an embodiment of the invention. The switching device comprises an electric switch 10. The switching device further comprises an electrically conductive housing 20 to which the switch 10 is mounted. By means of the switching device, an electric connection can be established between a first electric conductor 16 and a second electric conductor 18.

The switch 10 comprises a first electric contact assembly 12 that is electrically connected to the first electric conductor 16 and a second electric contact assembly 14 that is electrically connected to the second electric conductor 18. The second contact assembly is movable in relation to the first contact assembly and in relation to the housing 20. When the first and second contact assembly are in contact, the switch is in a closed position and an electric connection is established between the first conductor 16 and the second conductor 18. FIG. 1 illustrates the switch in its closed position. The electric connection path can e.g. run via at least a part of the housing that can be in electric contact with the switch, or it can run via other electrically conducting elements inside the housing, e.g. the illustrated conductor 21. When the first and second contact assembly are not in contact, the switch is in an open position. FIG. 2 illustrates the switch in its open position. The switch as such is conventional and known to the skilled person and is therefore not described in more detail. The switch may e.g. be a vacuum switch or a puffer switch. During normal operation, the switch will be in its closed position, which will be referred to as its first position.

The switching device further comprises an operating shaft 30, of an electrically insulating material, and an actuator member 40, also of an electrically insulating material. The housing 20 is provided with an opening 24 that leads into the housing (see FIG. 3), and through which a part of the operating shaft 30 is inserted into the housing. The operating shaft extends through the opening and the housing without directly contacting the housing. The operating shaft is rotatable in relation to the housing, about its longitudinal axis Y thus forming its rotation axis. The actuator member 40 is located inside the housing 20 and movable in relation to the housing. A first end 42 of the actuator member is mechanically coupled to the operating shaft 30 inside the housing 20 and the other second end 44 of the actuator member 40 is coupled to a mount member for the second movable contact assembly 14. When the operating shaft is rotated it will actuate the actuator member and the actuator member will in turn cause the second contact assembly 14 to move away from contact with the first contact assembly 12 into a second open position, and break the electric connection between the first electric conductor 16 and the second electric conductor 18.

As mentioned, the operating shaft 30 extends through the opening 24 and through the housing 20 without directly contacting the housing. Thus the operating shaft has a maximum diameter that is smaller than the smallest diameter of the opening 24 in the housing that leads into the housing. The opening has a rounded shape and it has a circumferential edge 23 by means of which it is delimited in the housing. Usually the opening is circular, but it may also have other rounded shapes. The operating shaft 30 is supported in the housing by the electrically insulated actuator member 40 that is mounted inside the housing 20. The actuator member 40 is movably supported in the housing 20 at a connection area 26 that is located inside the housing. The actuator member can e.g. be supported directly in the housing, e.g. as in FIG. 4, or it can e.g. be supported by means of a bearing device 28 mounted in the housing, e.g. as in FIG. 5. The connection area forms an interface 27 between the insulated actuator member 40 and the electrically conductive housing 20. When the switching device is used in a gas-insulated switchgear, and the switching device is surrounded by an insulating gas, this interface is apt to constitute a triple point TP.

According to the invention, the interface is located at a first distance D from the longitudinal axis Y of the operating shaft 30, which distance is longer than a second distance d between the longitudinal axis Y of the operating shaft 30 and the circumferential edge 23 that delimits the opening 24 in the housing, which first and second distances are measured in the same radial direction in relation to the longitudinal axis Y. This is also schematically illustrated in FIG. 6, which shows an enlarged partial cross section along B-B of FIG. 4. As a result, the interface and the triple point TP are completely hidden from outside by the housing 20 and will be shielded by the housing. There will be no triple point at the opening into the housing as in prior art. Thus the risk for electrical discharges is reduced. This has also the advantage that the switching device is suitable for use in metal enclosed gas insulated switchgear when other insulation gases than SF6 are used. When the triple points are shielded the compactness of the switchgear can be preserved, even if utilising other insulation fluids than SF6 which have lesser dielectric performance.

Figure 3:
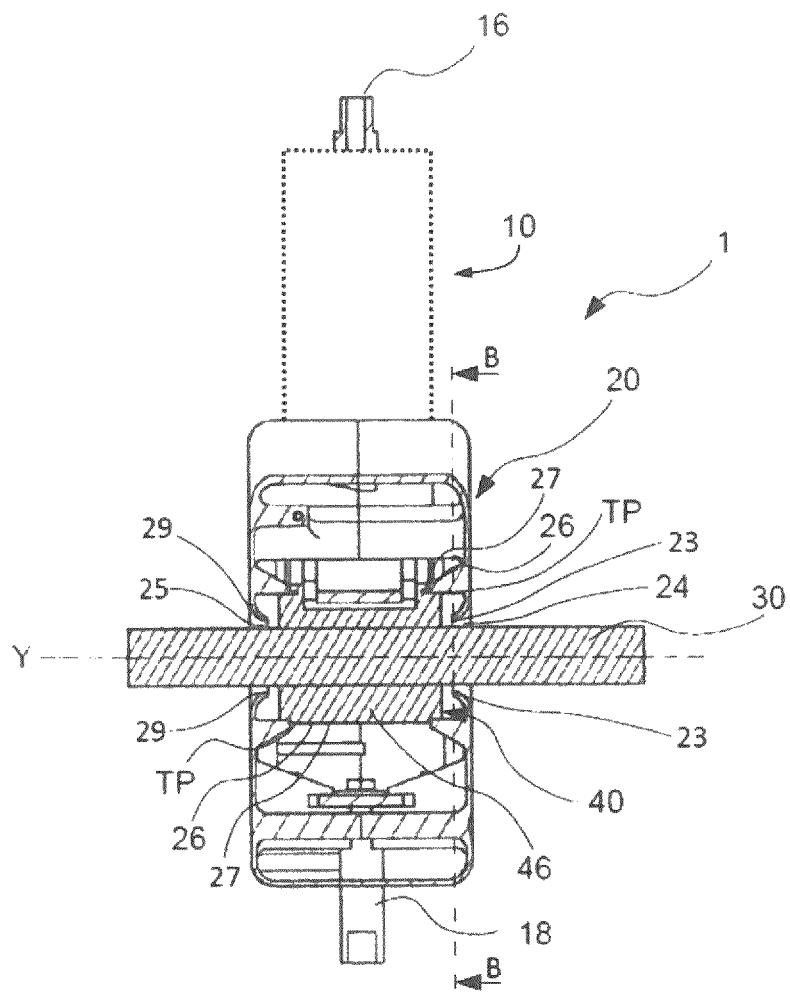
FIG. 3 is a schematic side view, partially in cross section along A-A, of the switching device illustrated in FIG. 1.
Figure 4:
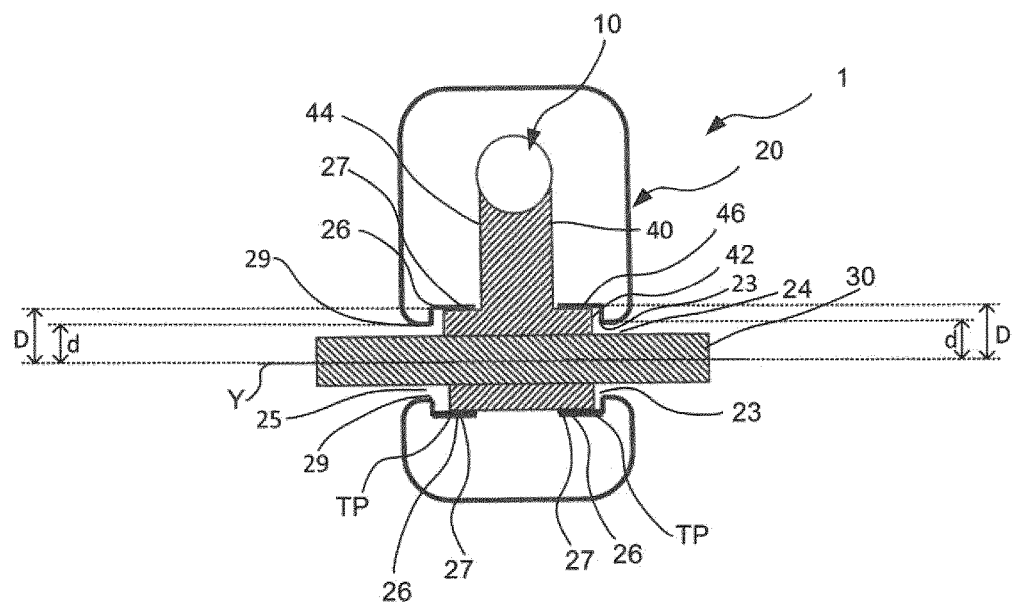
FIG. 4 is a partial schematic top view, in cross section, of the first embodiment of the switching device according to the present invention.
Figure 5:
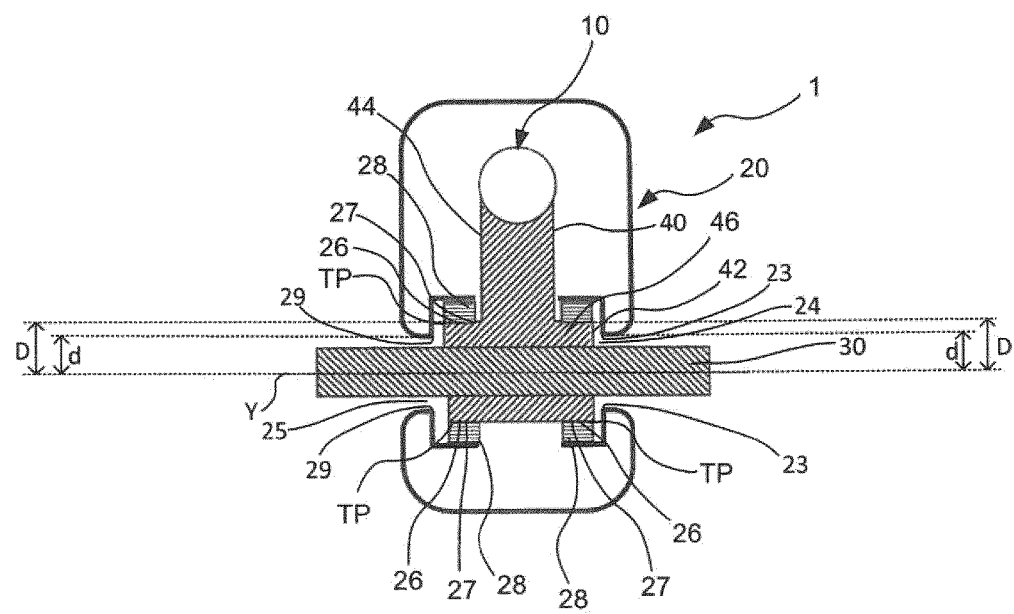
FIG. 5 is a partial schematic top view, in cross section, of a second embodiment of a switching device according to the present invention.
Figure 7:
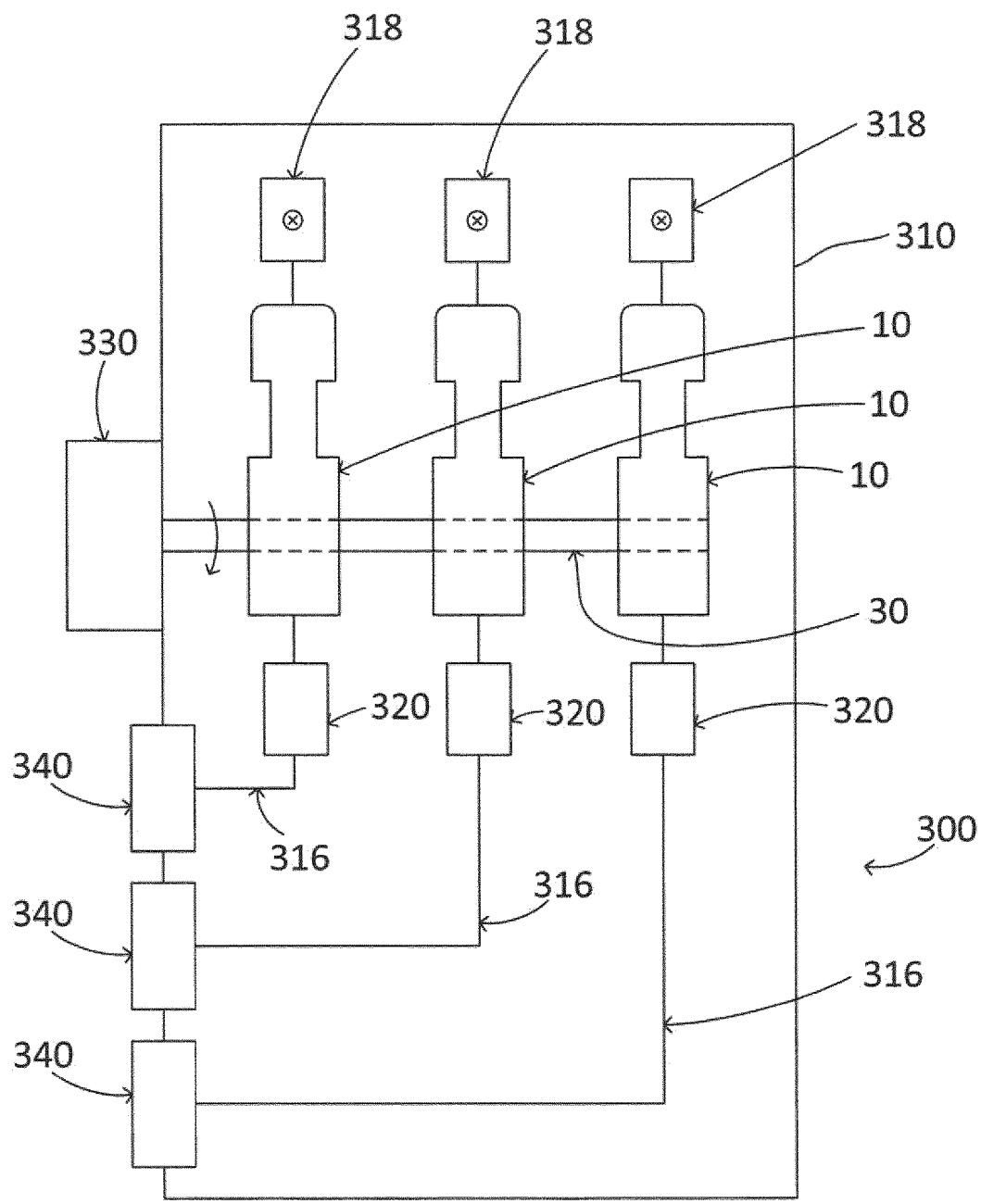
FIG. 7 shows schematically an embodiment of a switchgear comprising a switching device according to the present invention.

In the embodiment in FIG. 4, the actuator member is rotatably supported directly in the housing, in the connection area 26, on two sides of the actuator member. In the embodiment in FIG. 5, the actuator member is rotatably supported in the housing in the connection area by means of at least one bearing device 28 mounted in the housing. In the illustrated embodiment, there are two bearing devices 28, one on each side of the first end 42 of the actuator member 40. The bearing device 28 is an electrically conductive bearing device that is attached mechanically and electrically to the electrically conductive housing. The actuator member 40 is rotatably supported against the bearing device 28 and the connection area 26 that forms an interface 27 is located between the actuator member 40 and the bearing device 28. This interface is consequently apt to constitute the above described triple point TP. In analogy with the embodiment of FIG. 4, the triple point TP will be completely hidden from outside by the housing 20 and it will be shielded by the housing. It is also conceivable that the bearing device can be a non-conductive bearing device. In that case, the triple point would occur where the bearing device is connected to the housing, and that connection area would form the mentioned interface. Such a triple point would be even further away from the opening into the housing, and also be hidden by the housing. It is also conceivable that the actuator member is not In the illustrated example of FIGS. 3-5, the housing is illustrated as having two openings 24 and 25. The operating shaft enters the housing through the opening 25, extends through the housing, and exits from the housing through the opening 25. The first opening can be said to be a first entry opening 24 for the operating shaft and the second opening 25 can be said to be a second exit opening for the operating shaft. The entire operating shaft is not inserted into the housing, but only a part thereof. This is because the outer end part of the operating shaft should be connected to an external operating mechanism 330, e.g. as illustrated in FIG. 7. One and the same operating shaft 30 may also extend through several switching devices, as shown in FIG. 7, and operate these switching devices simultaneously. With regard to the last switching device, i.e. the switching device most remote from the operating mechanism, the outermost end of the operating shaft 30 does not necessarily have to exit out of the housing, through an exit opening. Instead, it is possible that the housing has no exit opening and the outermost end of the shaft is located within the housing. In this description, reference is mainly made to the opening 24, which is illustrated as being the first entry opening for the shaft. However, it should be understood that whatever is described in relation to the opening 24 is also applicable to the second exit opening 25 for the operating shaft, whenever such an exit opening in the housing exists. Thus, the operating shaft 30 extends through the second exit opening 25 without directly contacting the housing 20 at the second exit opening, and the interface 27 is located at a first distance D from the longitudinal axis Y of the operating shaft 30 that is longer than a second distance d between the longitudinal axis Y of the operating shaft 30 and a circumferential edge 29 that delimits the second opening 25 in the housing, which first and second distances are measured in the same radial direction in relation to the longitudinal axis Y.

As described above, the operating shaft 30 is supported in the housing by the insulated actuator member 40 that is mounted inside the housing 20, see FIGS. 1, 2 and 3. In the illustrated embodiments, the actuator member 40 has a first end 42 coupled to the operating shaft 30, which first end comprises a tube shaped part 46 for receiving the operating shaft. The tube-shaped part is coaxial and concentric with the longitudinal axis Y of the operating shaft and surrounds the operating shaft. The tube-shaped part 46 has a hollow interior with a shape that corresponds to the external shape of the operating shaft for locking engagement between the two parts. Possible designs of the cooperating outer surface of the operating shaft and the inner surface of the hollow interior of the tube-shaped part will be described below. Other designs for locking engagement between the two parts can also be foreseen. As an alternative to one tube-shaped part it may for example be possible to have two or more tube-shaped parts at the first end of the actuator member that cooperate to support the operating shaft. In the illustrated example, the operating shaft is supported in the housing solely by the actuator member, but other supplementary support devices can be used if required. In the illustrated embodiments it is the first end 42 of the actuator member 40 that provides the interface 27 with the housing, and in particular it is part of the tube shaped part 46 that provides the interface with the housing 20, either directly or via a bearing. It should be mentioned that when there is no bearing, the part of the housing 20 that comprises the connection area 26 that forms the interface 27 between the actuator member 40 and the housing 20 does not have to be configured to surround the actuator member completely. Instead, the actuator member may be supported in the housing by means of several support members at connection areas, which each one forms an interface between the actuator member and the housing. Each one of these interfaces should be located at a first distance D from the longitudinal axis Y of the operating shaft that is longer than a second distance d between the longitudinal axis Y of the operating shaft and a circumferential edge that delimits the opening in the housing, which first and second distances are measured in the same radial direction in relation to the longitudinal axis Y.

In other words, the interface 27 can be generally described as located at a distance D from the longitudinal axis Y of the operating shaft 30 that is longer than a maximum distance d between the longitudinal axis Y of the operating shaft 30 and any point on the circumferential edge 23 that delimits the opening 24 in the housing, which point is located within an angle sector in relation to the longitudinal axis Y which angle sector also includes the interface.

In the illustrated example, the actuator member 40 is engaged in an interlocking manner with the operating shaft 30. In the illustrated example the operating shaft has a hexagonal profile, but the profile can e.g. be another polygonal profile or groove profile that can interact with a corresponding inner surface of the actuator member. The actuator member 40 is rotatable in relation to the housing, about an axis of rotation that is coaxial with the rotation axis of the operating shaft 30, i.e. the longitudinal axis Y of the operating shaft. Thus the actuator member and the operating shaft have a common rotation axis. The actuator member 40 is locked in rotation with the operating shaft. When rotating the operating shaft 30, the actuator member 40 will also rotate and thereby act to move the movable second contact assembly 14 away from the first contact assembly 12 and thereby opening the switch. Thus the operating shaft 30 is adapted to control the movement of the second contact assembly 14 of the switch and thereby to control the opening and closing of the switch. The operating shaft can be used to operate the switch 10 from outside of an encapsulation in which the switching device can be installed as a part of a switchgear, see FIG. 6. Also other types of coupling arrangements between the operating shaft and an actuator member can be foreseen. For example, the operating shaft may have an eccentric cross section. In the closed position, the actuator member would be pressed down such that the second contact assembly is in contact with the first contact assembly. When the operating shaft is rotated such that the contact area with the actuator member shifts from a part of the eccentric rotating shaft having a wider diameter to a part having a smaller diameter, the pressure on the actuator member will be released. The actuator member will then move, e.g. by means of a biasing spring, in a direction that will cause the first contact assembly coupled thereto to move away from the second contact assembly and thereby opening the switch.

Figure 6:
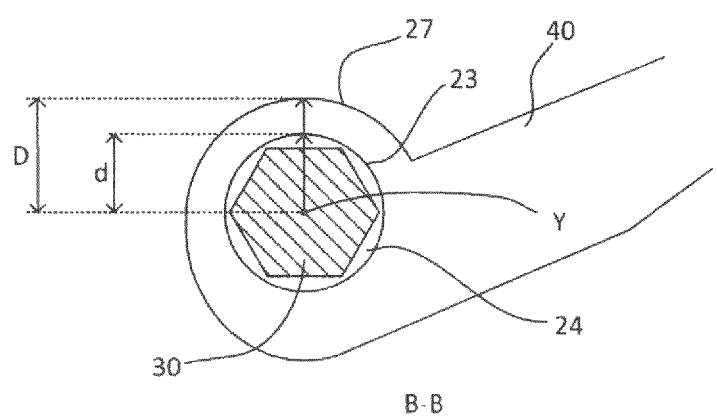
FIG. 6 is a schematic partial view, in cross section along B-B of FIG. 3.

In FIG. 6 is shown an example of an application of the present invention in a switchgear 300. Such a switchgear may e.g. be for a three phase AC electric power distribution system. In FIG. 6 is illustrated a module with three phases. The switchgear can comprise several further modules, and each module comprises three poles/phases. However, it should be noted that it is not necessarily required that all of the modules have switching devices according to the invention. There may very well be a mixture of switching devices of different designs.

Generally, in a switchgear, the switching device 10 according to the invention may be used together with an earthing switch, or it may be used in combination with a disconnector switch with or without an earthing switch. It can be used e.g. as a load break switch or as a circuit breaker.

The illustrated switchgear 300 comprises a sealed encapsulation 310 inside which the three switching assemblies are located, one for each phase. Each switching assembly comprises a switching device 10 that is connected to a first conductor 316 that enters the encapsulation 310 via an electric bushing 340. In the schematic illustration the switching device 10 is used in combination with a second switch 320, e.g. a disconnector switch. In a three-phase system, each phase is connected to the corresponding phase of another module by means of a second conductor 318 or busbar. The sealed encapsulation is gas tight and filled with an insulating gas, and preferably a gas that has a GWP of less than 2300, and preferably less than 150. The switchgear comprising the switching device according to the inventions as a component, is a metal encapsulated gas insulated switchgear. Also shown in FIG. 6 is the operating shaft 30 for operating the switching devices. The operating shaft is connected to an operating mechanism 330 located outside of the encapsulation 310.

The invention shall not be considered limited to the illustrated embodiments, but can be modified and altered in many ways, as realised by a person skilled in the art, without departing from the scope defined in the appended claims.

The invention claimed is:

1. A switching device for an encapsulated electric power distribution switchgear comprising
a switch,
an electrically conductive housing to which the switch is mounted, and which housing has an opening that leads into the housing, wherein the switch includes a first electric contact assembly electrically connected to a first electric conductor and a second electric contact assembly electrically connected to a second electric conductor, the second electric contact assembly being movable in relation to the first electric contact assembly and in relation to the housing,
the switching device further including
an insulated operating shaft of electrically insulating material for operating the switch and having a longitudinal axis Y and being rotatable about its longitudinal axis Y in relation to the housing, and of which a part is inserted into the housing via the opening,
an actuator member located inside the housing and having a first end coupled to the operating shaft and a second end coupled to the second electric contact assembly,
wherein, by rotation of the operating shaft coupled to the actuator member, the second electric contact assembly is movable between a first closed position of the switch and a second open position of the switch, in which closed position the second contact assembly is in contact with the first electric contact assembly and in which open position the second contact assembly is not in contact with the first electric contact assembly,
wherein
the actuator member is made of an electrically insulating material,
the operating shaft extends through the opening and into the housing without directly contacting the housing at the opening,
the operating shaft is supported in the housing by the actuator member,
the actuator member is movably supported in the housing at a connection area that is located within the housing and which connection area forms an interface between the actuator member and the housing, and that
the interface is located at a first distance D from the longitudinal axis Y of the operating shaft that is longer than a second distance d between the longitudinal axis Y of the operating shaft and a circumferential edge that delimits the opening in the housing, which first and second distances are measured in the same radial direction in relation to the longitudinal axis Y.

2. The switching device according to claim 1, wherein the actuator member is rotatably supported in the housing in the connection area.

3. The switching device according to claim 2, wherein the actuator member is rotatably supported in the housing in the connection area by means of at least one bearing device mounted in the housing.

4. The switching device according to claim 3, wherein the at least one bearing device is an electrically conductive bearing device that is attached mechanically and electrically to the electrically conductive housing.

5. The switching device according to claim 2, wherein the actuator member is supported directly in the housing in the connection area.

6. The switching device according to claim 2, wherein the operating shaft is supported in the housing solely by the actuator member.

7. The switching device according to claim 2, wherein the second end of the actuator member includes a tube shaped part and the operating shaft is coupled to the actuator member by being supported in the tube shaped part of the actuator member.

8. The switching device according to claim 2, wherein the opening is a first entry opening for the operating shaft into the housing and the housing further includes a second exit opening through which the operating shaft exits from the housing, and wherein the operating shaft extends through the second exit opening without directly contacting the housing at the second exit opening, and the interface is located at a first distance D from the longitudinal axis Y of the operating shaft that is longer than a second distance d between the longitudinal axis Y of the operating shaft and a circumferential edge that delimits the second opening in the housing, which first and second distances are measured in the same radial direction in relation to the longitudinal axis Y.

9. The switching device according to claim 1, wherein the actuator member is supported directly in the housing in the connection area.

10. The switching device according to claim 1, wherein the operating shaft is supported in the housing solely by the actuator member.

11. The switching device according to claim 1, wherein the second end of the actuator member includes a tube shaped part and the operating shaft is coupled to the actuator member by being supported in the tube shaped part of the actuator member.

12. The switching device according to claim 1, wherein the opening is a first entry opening for the operating shaft into the housing and the housing further includes a second exit opening through which the operating shaft exits from the housing, and wherein the operating shaft extends through the second exit opening without directly contacting the housing at the second exit opening, and the interface is located at a first distance D from the longitudinal axis Y of the operating shaft that is longer than a second distance d between the longitudinal axis Y of the operating shaft and a circumferential edge that delimits the second opening in the housing, which first and second distances are measured in the same radial direction in relation to the longitudinal axis Y.

13. An electric power distribution switchgear including a sealed gas tight encapsulation inside which is located at least one switching device including
a switch,
an electrically conductive housing to which the switch is mounted, and which housing has an opening that leads into the housing,
wherein the switch includes a first electric contact assembly electrically connected to a first electric conductor and a second electric contact assembly electrically connected to a second electric conductor, the second electric contact assembly being movable in relation to the first electric contact assembly and in relation to the housing,
the switching device further including
an insulated operating shaft of electrically insulating material for operating the switch and having a longitudinal axis Y and being rotatable about its longitudinal axis Y in relation to the housing, and of which a part is inserted into the housing via the opening, an actuator member located inside the housing and having a first end coupled to the operating shaft and a second end coupled to the second electric contact assembly, wherein, by rotation of the operating shaft coupled to the actuator member, the second electric contact assembly is movable between a first closed position of the switch and a second open position of the switch, in which closed position the second contact assembly is in contact with the first electric contact assembly and in which open position the second contact assembly is not in contact with the first electric contact assembly, wherein the actuator member is made of an electrically insulating material, the operating shaft extends through the opening and into the housing without directly contacting the housing at the opening, the operating shaft is supported in the housing by the actuator member, the actuator member is movably supported in the housing at a connection area that is located within the housing and which connection area forms an interface between the actuator member and the housing, and that the interface is located at a first distance D from the longitudinal axis Y of the operating shaft that is longer than a second distance d between the longitudinal axis Y of the operating shaft and a circumferential edge that delimits the opening in the housing, which first and second distances are measured in the same radial direction in relation to the longitudinal axis Y.

14. The electric power distribution switchgear according to claim 13, including a load break switch having a switching device including a switch, an electrically conductive housing to which the switch is mounted, and which housing has an opening that leads into the housing, wherein the switch includes a first electric contact assembly electrically connected to a first electric conductor and a second electric contact assembly electrically connected to a second electric conductor, the second electric contact assembly being movable in relation to the first electric contact assembly and in relation to the housing, the switching device further including an insulated operating shaft of electrically insulating material for operating the switch and having a longitudinal axis Y and being rotatable about its longitudinal axis Y in relation to the housing, and of which a part is inserted into the housing via the opening, an actuator member located inside the housing and having a first end coupled to the operating shaft and a second end coupled to the second electric contact assembly, wherein, by rotation of the operating shaft coupled to the actuator member, the second electric contact assembly is movable between a first closed position of the switch and a second open position of the switch, in which closed position the second contact assembly is in contact with the first electric contact assembly and in which open position the second contact assembly is not in contact with the first electric contact assembly, wherein the actuator member is made of an electrically insulating material, the operating shaft extends through the opening and into the housing without directly contacting the housing at the opening, the operating shaft is supported in the housing by the actuator member, the actuator member is movably supported in the housing at a connection area that is located within the housing and which connection area forms an interface between the actuator member and the housing, and that the interface is located at a first distance D from the longitudinal axis Y of the operating shaft that is longer than a second distance d between the longitudinal axis Y of the operating shaft and a circumferential edge that delimits the opening in the housing, which first and second distances are measured in the same radial direction in relation to the longitudinal axis Y; and a disconnector switch.

15. The electric power distribution switchgear according to claim 14, wherein a dielectric insulation medium is present in the encapsulation, in particular a dielectric insulation gas including an organofluorine compound selected from the group consisting of: a fluorether, an oxirane, a fluoramine, a fluoroketone, a fluoroolefin, and mixtures and/or decomposition products thereof.

16. The electric power distribution switchgear according to claim 13, wherein a dielectric insulation medium is present in the encapsulation, in particular a dielectric insulation gas including an organofluorine compound selected from the group consisting of: a fluorether, an oxirane, a fluoramine, a fluoroketone, a fluoroolefin, and mixtures and/or decomposition products thereof.

* * * * *